United States Patent [19]

Seager

[11] Patent Number: 5,235,560
[45] Date of Patent: Aug. 10, 1993

[54] WRISTWATCH RADIOTELEPHONE

[75] Inventor: Richard H. Seager, Mystic, Conn.

[73] Assignee: Timex Corporation, Middlebury, Conn.

[21] Appl. No.: 961,655

[22] Filed: Oct. 16, 1992

[51] Int. Cl.⁵ .................. G04B 47/00; G04B 37/00; A44C 5/00
[52] U.S. Cl. ............................ 368/10; 368/13; 368/282; 224/164; 379/90; 379/428
[58] Field of Search .................. 368/10, 13, 88, 276, 368/281, 282, 278; 224/164; 379/90, 428, 430

[56] References Cited

U.S. PATENT DOCUMENTS

| | | | |
|---|---|---|---|
| 3,032,651 | 5/1962 | Gisiger-Stahl et al. | 250/14 |
| 4,821,532 | 4/1989 | Jaques et al. | 63/3 |
| 4,847,818 | 7/1989 | Olsen | 368/10 |
| 4,926,474 | 5/1990 | Marks | 379/433 |
| 5,008,864 | 4/1991 | Yoshitake | 368/10 |

*Primary Examiner*—Vit W. Miska
*Attorney, Agent, or Firm*—Robert R. Jackson

[57] ABSTRACT

A wristwatch radiotelephone mechanism has three substantially rigid members connected to one another in a series by connection mechanisms connected between adjacent members in the series. The connection mechanisms allow the members to be arranged either in a C-shaped array when the apparatus is to be worn on the wrist as a wristwatch, or in a more elongated array when the apparatus is to be used as a hand-held radiotelephone.

10 Claims, 4 Drawing Sheets

WRISTWATCH RADIOTELEPHONE

BACKGROUND OF THE INVENTION

This invention relates to a combined wristwatch and radiotelephone, and more particularly to a wristwatch which can be converted temporarily to a form suitable for use as a hand-held radiotelephone.

Olsen U.S. Pat. No. 4,847,818 shows a wristwatch which can be removed from the user's wrist and temporarily reconfigured for use as a hand-held radiotelephone. The Olsen apparatus has many desirable features, but it would also be desirable to have a structure which formed a somewhat more definite, predetermined shape when reconfigured as a radiotelephone. This would tend to give the article a more substantial "feel" when used as a radiotelephone, thereby making the article more acceptable and attractive to at least some users.

In view of the foregoing, it is an object of this invention to provide a wristwatch radiotelephone which can be made to positively assume a definite shape of a first kind when configured for use as a wristwatch, and which can similarly be made to positively assume a definite shape of a second kind when configured for use as a radiotelephone.

It is a more particular object of this invention to provide a wristwatch radiotelephone which can be made to positively assume a predetermined curved shape when configured for use as a wristwatch, and which can be made to positively assume a predetermined elongated shape when configured for use as a radiotelephone.

SUMMARY OF THE INVENTION

These and other objects of the invention are accomplished in accordance with the principles of the invention by providing a wristwatch radiotelephone comprising plural (e.g., three) substantially rigid members. These members are joined together end to end by mechanical connections which allow the members to be collectively arranged either in a curved form when the apparatus is to be worn on the wrist as a wristwatch, or in a more longitudinal or elongated series when the apparatus is to be used as a radiotelephone. To permit this rearrangement of the members, two of the connections between adjacent members include the capability of allowing the adjacent members to be rotated approximately 180° relative to one another about an associated axis which passes through the connection and adjacent portions of the associated members parallel to a plane which is intercepted by all of the members when the apparatus is in the curved, wristwatch form. In addition, the same two connections preferably include the capability of allowing the associated members to be pivoted relative to one another to a limited extent about another associated axis which is parallel to the longitudinal axis of the user's wrist when the apparatus is arranged and worn as a wristwatch. This pivotal movement allows the apparatus to fit on wrists of different sizes, facilitates removal from the wrist, and may also allow some adjustment of the relative positions of the microphone and speaker when the apparatus is used as a radiotelephone.

Further features of the invention, its nature and various advantages will be more apparent from the accompanying drawings and the following detailed description of the preferred embodiments.

DETAILED DESCRIPTION OF THE PREFERRED EMBODIMENTS

Olsen U.S. Pat. No. 4,847,818, which is hereby incorporated by reference herein, shows all of the electronic components and circuitry needed for a wristwatch radiotelephone. All of those same components and circuitry can be used in a wristwatch radiotelephone constructed in accordance with the present invention. Accordingly, it will not be necessary to repeat here any of the details regarding that portion of the apparatus.

Figure 1:
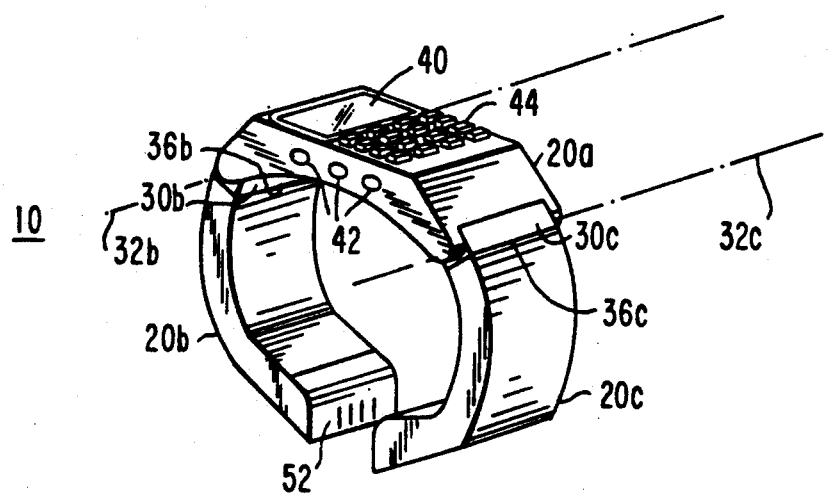
FIG. 1 is a simplified perspective view of an illustrative embodiment of a wristwatch radiotelephone constructed in accordance with the principles of this invention in the wristwatch configuration.

As shown in FIG. 1, an illustrative preferred embodiment of a wristwatch radiotelephone 10 constructed in accordance with this invention includes a main body member 20a, and two arcuate secondary members 20b and 20c which are connected to respective opposite ends of member 20a by mechanical connections 30b and 30c. If desired, the ends of members 20b and 20c which are depicted as free may be releasably connected to one another by a releasable catch, latch, clasp, or link mechanism (not shown), but in the preferred embodiments this is not necessary.

Figure 2:
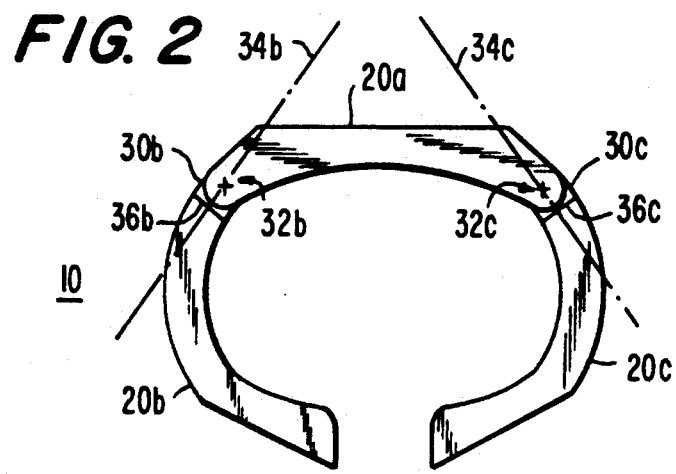
FIG. 2 is a simplified elevational view of the apparatus of FIG. 1. The control buttons shown in FIG. 1 are omitted from FIG. 2.

When arranged as shown in FIGS. 1 and 2, members 20 and connections 30 form a nearly closed C having a size and shape suitable for allowing the apparatus to be worn on the wrist as a wristwatch. In the depicted preferred embodiment main body member 20a includes a display 40, timepiece and telephone control buttons 42, and telephone dialing buttons 44 (respectively similar to elements 10–12 in the above-mentioned Olsen patent).

Figure 5:
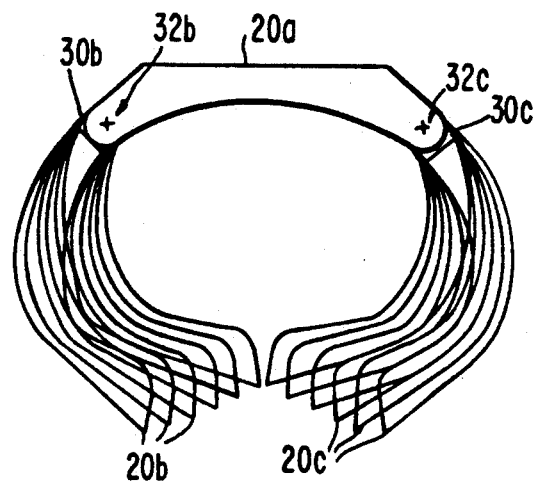
FIG. 5 is a view similar to FIG. 2 showing the pivotability of the members of the wristwatch radiotelephone relative one another.

When members 20 are arranged in the curved form shown in FIGS. 1 and 2, the inner surfaces of members 20 define a generally elliptical shape which conforms to the elliptical shape of the human wrist. In order to allow the apparatus to fit comfortably on wrists of different sizes, each of connections 30b and 30c is preferably capable of allowing the associated secondary member 20b and 20c to pivot by a limited amount relative to main member 20a about an associated pivot axis 32b or 32c which passes through the connection mechanism parallel to the user's wrist (see also FIG. 5 which illustrates the typical extremes of such pivotal motion of members 20b and 20c). Axes 32b and 32c may also be characterized as substantially perpendicular to a plane intercepted by all of members 20 when the apparatus is in the curved, wristwatch form. For example, the plane of the paper on which FIG. 2 is drawn is such a plane. If desired, connection mechanisms 30b and 30c may include springs for resiliently urging members 20b and 20c to pivot toward one another to help ensure that the article always grips the wrist. Alternatively, connection mechanisms 30b and 30c may each define (by pivotal detents) several positions to which the associated secondary members can be pivoted and in any of which positions the secondary members tend to remain. In this way the user can select the most comfortable size for his or her wrist, and the apparatus will retain that size unless it is deliberately modified by the user. For example, each of the pivotal positions of members 20b and 20c shown in FIG. 5 may be a detented position.

Whether equipped with the above-described springs or detents, each of connection mechanisms 30b and 30c also preferably includes stops for limiting the pivotal motion about the associated axis 32 to a relatively small angle such as approximately 25°. This is a large enough angle to allow the apparatus to accommodate any anticipated wrist size, and also to facilitate removal of the apparatus from the wrist. For example, if each connection is capable of pivoting a maximum of approximately 25°, and if each connection is also provided with pivotal detents as described above, FIG. 5 illustrates that each connection may have six detent positions pivotally spaced approximately 5° apart.

Figure 3:
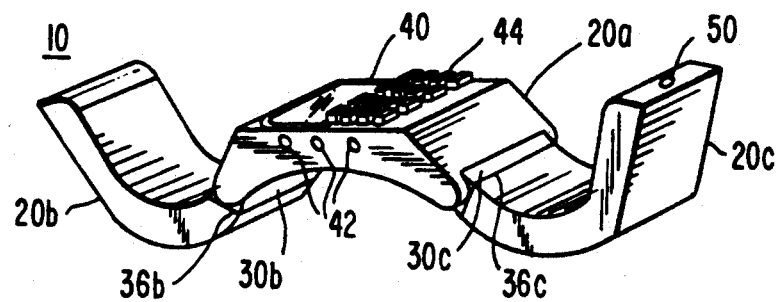
FIG. 3 is a simplified perspective view of the apparatus of FIG. 1 opened out to the radiotelephone configuration.
Figure 4:
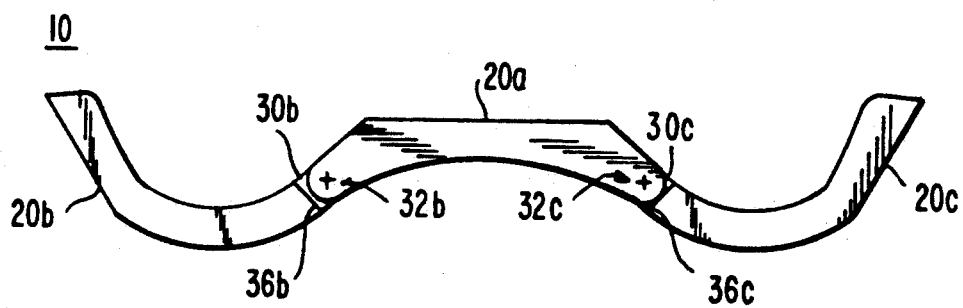
FIG. 4 is a simplified elevational view of the apparatus of FIG. 3. The control buttons shown in FIG. 3 are omitted from FIG. 4

When apparatus 10 is removed from the wrist, connections 30 allow members 20 to be rearranged from the substantially annular arrangement shown in FIGS. 1 and 2 to the more longitudinal or elongated arrangement shown in FIGS. 3 and 4. To rearrange members 20 in this way, each of connections 30b and 30c allows the associated secondary member 20b and 20c to rotate 180° relative to main body member 20a about the axis 34a or 34b which passes through that connection and the adjacent portions of the associated members 20. Each axis 34 is perpendicular to the axis 32 of the associated connection 30 and approximately tangent to the circumference of the apparatus when the apparatus is in the curved, wristwatch form. Each axis 34 is also parallel to the plane mentioned above in relation to axes 32. In the depicted embodiment the rotation about each axis 34 occurs at the line 36b or 36c at which member 20b or 20c meets the associated connection mechanism 30b or 30c. Accordingly, there is an internal rotatable connection perpendicular to the plane defined by each of lines 36 between the associated connection mechanism 30 and the associated secondary member 20b or 20c. If desired, each of these rotatable connections can be provided with detents 180° apart so that members 20 tend to remain in the relative rotational positions shown in either FIGS. 1 and 2 or FIGS. 3 and 4. Each of these rotatable connections can also be provided with a stop just beyond each detent position to prevent excessive relative rotation of members 20 which could damage electrical connections running through connections 30 between the radiotelephone components of the apparatus. The rotatable connections about axes 34 can therefore be similar to the rotatable connections about axes 32a and 32b in the apparatus shown in commonly assigned, concurrently filed application Ser. No. 07/961,652, which is hereby incorporated by reference herein. Alternatively, the rotatable rotatable connections about axes 34 in the apparatus shown in commonly assigned, concurrently filed application Ser. No. 07/961,656, which is also hereby incorporated by reference herein. Other, somewhat analogous rotatable connections are shown in commonly assigned, concurrently filed application Ser. No. 07/962,353, which is also hereby by reference herein.

Figure 8:
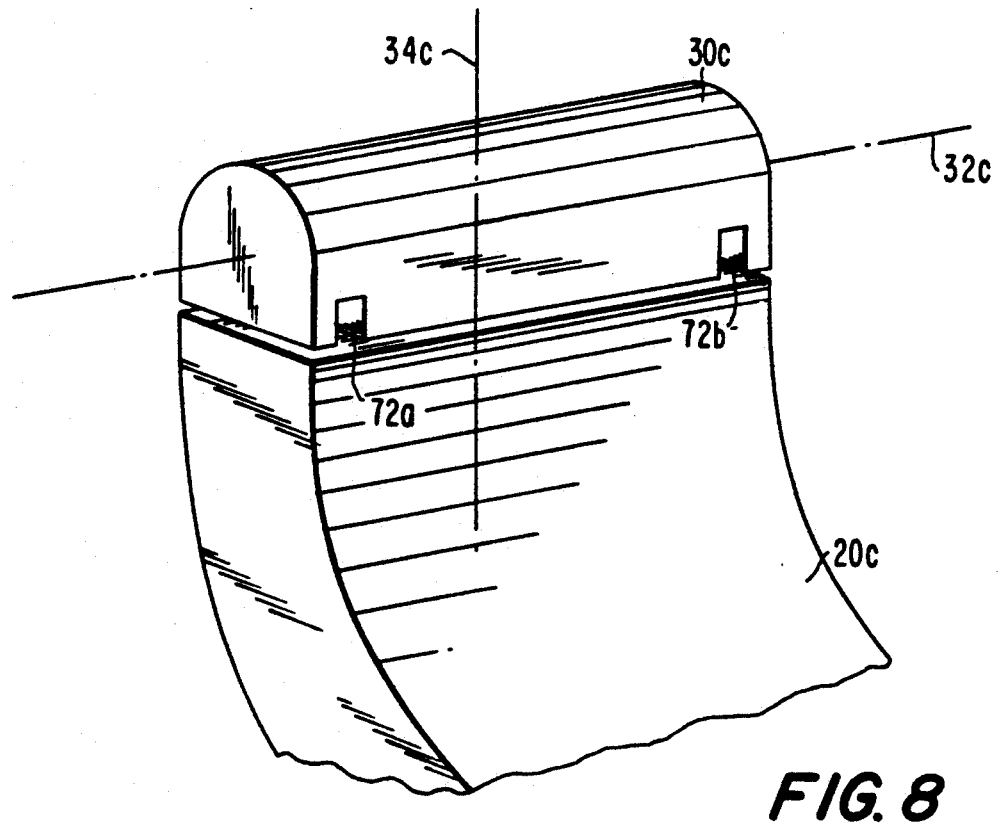
FIG. 8 is another view similar to FIGS. 6 and 7 showing another operative condition of the apparatus.
Figure 6:
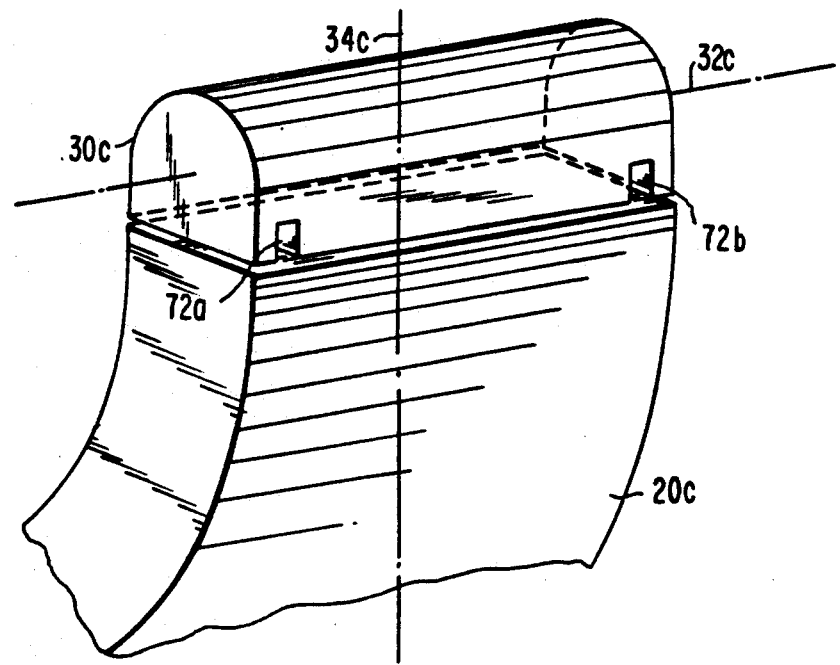
FIG. 6 is an enlarged perspective view of a portion of the apparatus of FIGS. 1–5 in one operative condition.
Figure 7:
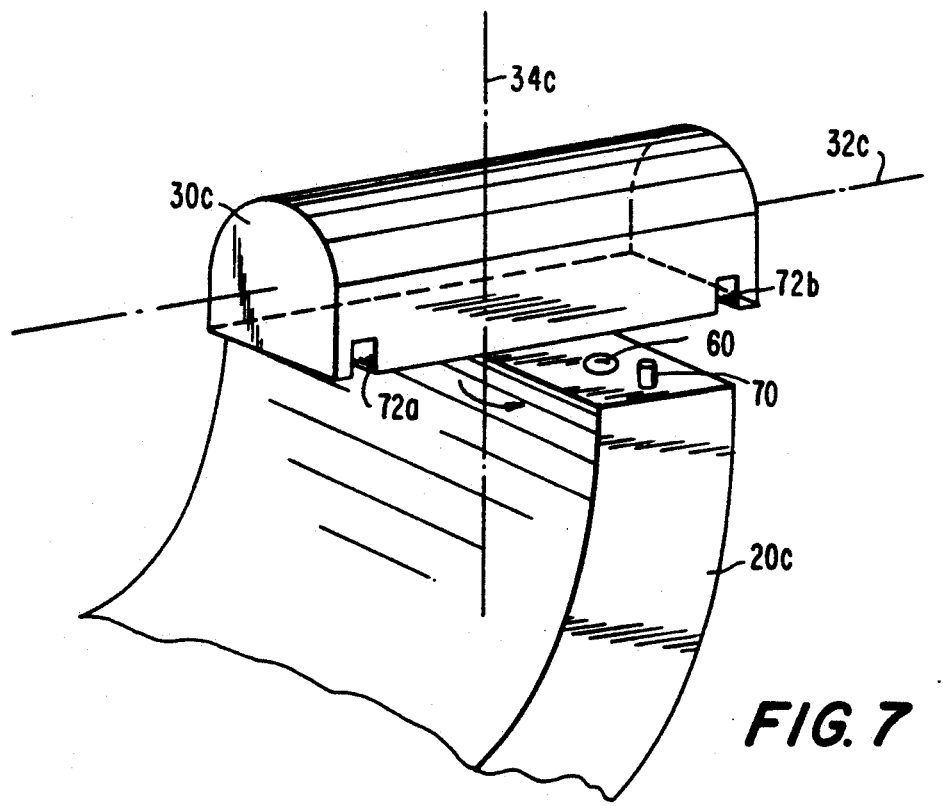
FIG. 7 is a view similar to FIG. 6 showing a transitional operative condition of the apparatus.

Although the immediately above-described features of the 180° rotatable connections about axes 34 could be provided in other ways, FIGS. 6–8 illustrate one possible implementation of a representative one of those connections. (Member 20a is completely omitted from these FIGS. for greater clarity.) Members 20c and 30c are rotatable relative to one another about a rotatable connection (not shown) which is concentric with axis 34c and which holds the two members together while permitting relative rotation of them. Axis 34c is perpendicular to the face to face surfaces of members 20c and 30c and passes centrally through those surfaces. A spring-loaded ball 60 in member 20c projects resiliently up from that member as can be seen in FIG. 7. Two recesses (not shown) for releasably receiving the projecting portion of ball 60 are provided in the surface of connection mechanism 30c which faces member 20c. These two recesses are spaced 180° from one another about axis 34c. Accordingly, ball 60 cooperates with these recesses to provide detents for releasably holding elements 20c and 30c in either the relative positions shown in FIG. 6 or the relative positions shown in FIG. 8. However, the resistance of these detents can be overcome manually in order to allow member 20c to rotate relative to member 30c about axis 34 as shown, for example, in FIG. 7.

In addition to ball 60 the surface of member 20c which is adjacent to connection member 30c has a pin 70 which projects up toward member 30c. Pin 70 projects into slot 72a in member 30c when members 20c and 30c are in the relative positions shown in FIG. 6. Pin 70 projects into slot 72b when members 20c and 30c are in the relative positions shown in FIG. 8. Slots 72 extend only a little more than half way across member 30c. Accordingly, the blind ends of slots 72 act as stops for pin 70 approximately 180° apart about axis 34c. Elements 70 and 72 therefore cooperate to prevent elements 20c and 30c from rotating more than about 180° relative to one another about axis 34c.

When apparatus 10 has been rearranged to the elongated configuration shown in FIGS. 3 and 4 and the user holds the apparatus in one hand along one side of his or her face, a radiotelephone microphone 50 (FIG. 3) adjacent the free end of secondary member 20c and a radiotelephone speaker 52 (FIG. 1) adjacent the free end of secondary member 20b are spaced apart and otherwise positioned and oriented for simultaneous use adjacent the user's mouth and ear. Elements 50 and 52 are respectively similar to elements 6 and 8 in the above-mentioned Olsen patent. Because all of members 20 and connections 30 are substantially rigid except when deliberately adjusted as described above, the apparatus always positively assumes substantially the same predetermined shape each time it is opened up to the radiotelephone configuration as described above. If desired, the limited pivoting about axes 32 may continue to be available when the apparatus is in the radiotelephone configuration so that the user can adjust the relative positions of microphone 50 and speaker 52.

After the apparatus has been used as a radiotelephone, it can be returned to its wristwatch configuration (FIGS. 1 and 2) by reversing the above-described operations required to place it in the radiotelephone configuration.

It will be understood that the foregoing is merely illustrative of the principles of this invention, and that various modifications can be made by those skilled in the art without departing from the scope and spirit of the invention. For example, the amount by which the apparatus can be pivoted about each of axes 32 can varied as desired. Similarly, if pivoting about axes 32 is detented, the number and spacing of the detent positions can be varied as desired.

The invention claimed is:

1. Apparatus which is convertible between a curved shape adapted for wearing around the wrist as a wristwatch and an elongated shape in which it is suitable for use as a hand-held radiotelephone with a microphone and a speaker adjacent respective opposite ends of said elongated shape comprising:
   a main body member having opposite first and second ends;
   first and second arcuate members; and
   first and second connection mechanisms for respectively connecting an end of a respective one of said first and second arcuate members to a respective one of said first and second ends, each of said connection mechanisms allowing the associated arcuate member to rotate relative to said main body member about an associated axis which passes through said connection mechanism and adjacent portions of said main body member and said associated arcuate member parallel to a plane intercepted by all of said members when said apparatus is in said curved shape, the rotation of said arcuate members being between (1) positions in which said arcuate members curve toward one another in the directions along said arcuate members away from said main body member, and (2) positions in which said arcuate members extend away from one another in said directions along said arcuate members away from said main body member.

2. The apparatus defined in claim 1 wherein each of said first and second connection mechanisms allows the associated arcuate member to rotate approximately 180° relative to the main body member about said axis associated with said connection mechanism.

3. The apparatus defined in claim 2 wherein each of said first and second connection mechanisms allows the associated arcuate member to rotate no more than approximately 180° relative to the main body member about said axis associated with said connection mechanism.

4. The apparatus defined in claim 1 wherein said microphone and said speaker are respectively disposed in said arcuate members remote from said connection mechanisms.

5. The apparatus defined in claim 1 wherein at least one of said connection mechanisms also allows the associated arcuate member to pivot relative to said main body member about a second axis which passes through said at least one connection mechanism substantially perpendicular to said plane.

6. The apparatus defined in claim 5 wherein said at least one connection mechanism allows the associated arcuate member to pivot approximately 25° relative to the main body member about said second axis.

7. The apparatus defined in claim 6 wherein said at least one connection mechanism allows the associated arcuate member to pivot no more than approximately 25° relative to the main body member about said second axis.

8. The apparatus defined in claim 1 wherein each of said connection mechanisms also allows the associated arcuate member to pivot relative to said main body member about an associated second axis which passes through said connection mechanism substantially perpendicular to said plane.

9. The apparatus defined in claim 8 wherein each of said connection mechanisms allows the associated arcuate member to pivot approximately 25° relative to the main body member about the associated second axis.

10. The apparatus defined in claim 9 wherein each of said connection mechanisms allows the associated arcuate member to pivot no more than approximately 25° relative to the main body member about the associated second axis.

* * * * *

UNITED STATES PATENT AND TRADEMARK OFFICE
CERTIFICATE OF CORRECTION

PATENT NO. : 5,235,560

DATED : August 10, 1993

INVENTOR(S) : Richard H. Seager

It is certified that error appears in the above-identified patent and that said Letters Patent is hereby corrected as shown below:

| Column | Line | |
|--------|------|---|
| 4 | 1 | Delete the second occurrence of "rotatable". |
| 4 | 2 | After "34" insert --can be similar to the rotatable connections about axes 34--. |
| 4 | 8 | After "hereby" insert --incorporated-- |

Signed and Sealed this

Tenth Day of May, 1994

*Attest:*

BRUCE LEHMAN

*Attesting Officer*  *Commissioner of Patents and Trademarks*